to an electrode 28. A second pair of parts is similarly held and connected to electrodes 29 and 30, respectively, of the welding circuit 16. The circuits are discharged during welding operations by moving electrodes 27 and 29 with parts carried thereby toward the parts connected to electrodes 28 and 30. As a part carried by either of the electrodes 27 and 29 approaches the part to be welded thereto, an arc occurs between the two parts melting the adjacent surfaces thereof which are welded together as the parts are pushed into contact with one another.

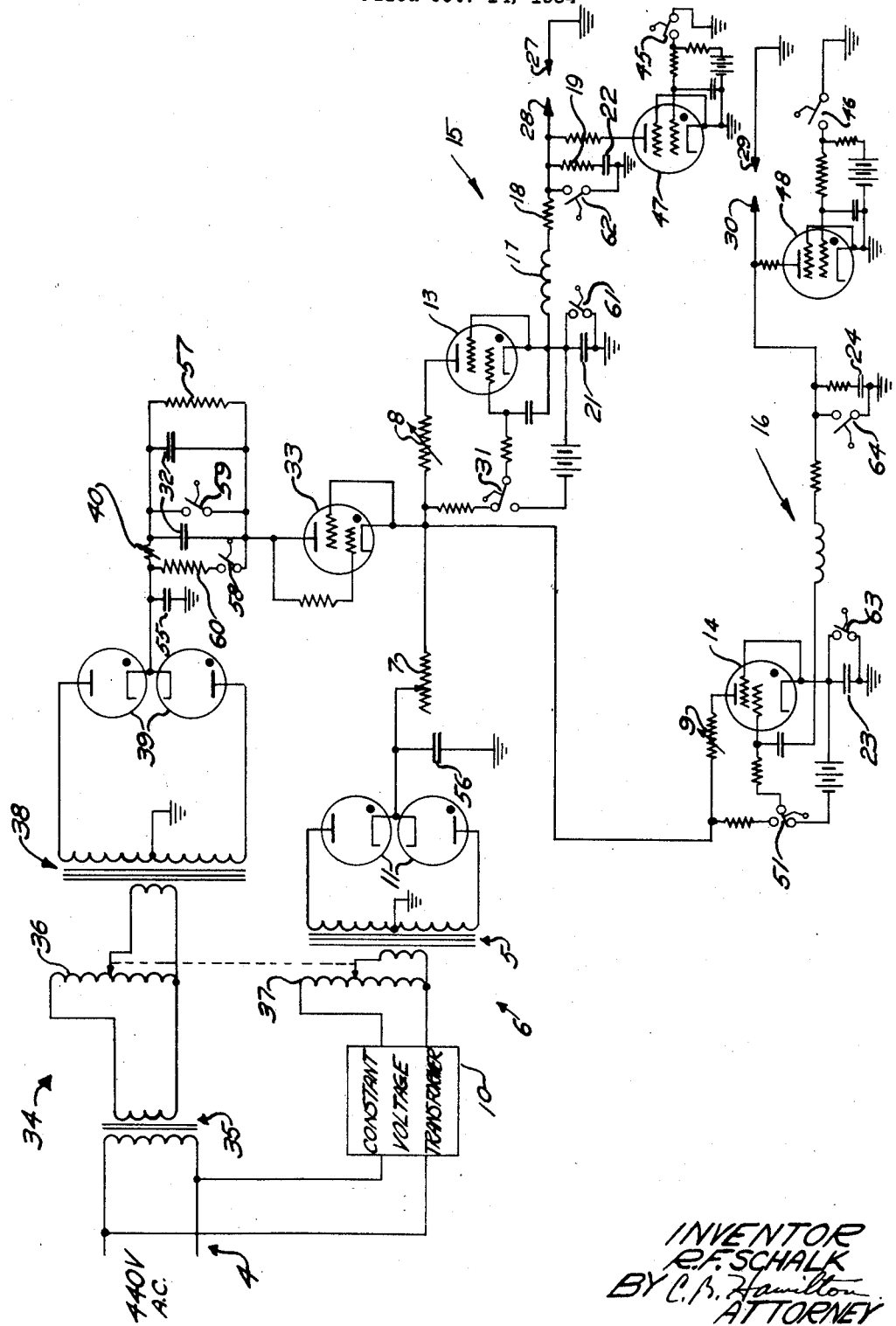

2,891,209

CAPACITOR-CHARGING SYSTEMS

Robert F. Schalk, Chicago, Ill., assignor to Western Electric Company, Incorporated, New York, N.Y., a corporation of New York Application October 14, 1954, Serial No. 462,154

14 Claims. (Cl. 320—1)

This invention relates to capacitor-charging systems, and more particularly to systems for charging capacitors of welding circuits.

In the use of certain types of welding circuits where capacitors are provided to store the necessary welding energy and are discharged during the welds, it is desirable to recharge the capacitors rapidly for succeeding welds. For precise welding operations, the capacitors must be precisely charged which requires a regulated source of power, and if the frequency of the welds is high, it is very expensive to provide sufficiently large regulated power supply to charge the capacitors. Also, there has been no satisfactory apparatus for preventing the high initial charging surge loads from disrupting or greatly slowing the charging output of the regulated transformers.

An object of the invention is to provide new and improved systems for charging capacitors supplying energy for welding systems.

A further object of the invention is to provide an apparatus for rapidly charging welding capacitors to precise voltages without the use of excessively large regulated transformers.

An apparatus illustrating certain features of the invention may include a regulated power supply of a predetermined voltage and an unregulated power supply of a voltage less than that of the regulated power supply. Means are provided for charging a welding capacitor simultaneously with both power supplies until the charge on the capacitor rises to the voltage of the unregulated power supply, then finishing the charge of the capacitor with the regulated power supply.

A complete understanding of the invention may be obtained from the following detailed description of an apparatus forming a specific embodiment thereof, when read in conjunction with the appended drawings, in which the single figure is a diagrammatic view of a circuit forming one embodiment of the invention.

Referring now in detail to the drawing, there is shown therein a circuit including an A.C. powerline 4 supplying a regulated power supply 6 having a transformer 10 having a regulated, precise peak voltage output, a step-up transformer 5 and rectifier tubes 11 connected through adjustable resistors 7, 8 and 9 to thyratron tubes 13 and 14, which form portions of and control the charging of welding circuits 15 and 16. The welding circuits 15 and 16 include welding power supply capacitors 21 and 22, and 23 and 24, respectively. The capacitors 21 and 22 form portions of a welding power supply network also including a coil 17, a resistor 18 and a resistor 19, certain features of the welding circuit 15 being disclosed and claimed in copending application Serial No. 425,288, filed April 23, 1954, now Patent No. 2,785,283, by E. E. Summer for "Welding Circuit." The welding circuit 16 is identical with the circuit 15 and is connected in parallel therewith.

One part to be welded to another part is connected electrically to and carried by a jaw type electrode 27, which is grounded, and the other part is connected electrically To charge the capacitors 21 and 22, the thyratron 13 is triggered by a cam-actuated switch 31. High capacitance capacitors 32 have been charged to an approximate voltage, for example, a voltage of 1,450 volts, by a conventional non-regulated power supply 34 including a transformer 35, a variac 36, a step-up transformer 38 and rectifying tubes 39. The capacitors 32 partially discharge in a surge through a blocking diode 33 to very rapidly effect the major portion of the charging of the capacitors 21 and 22 which have less capacitance than the capacitors 32, the voltage of the capacitors 32 dropping somewhat in so doing. The voltage output of the precise transformer 10, the step-up transformer 38 and full-wave rectifying tubes 11 are set by a variac 37 mechanically locked to the variac 36 to always provide a peak voltage output higher than that of the power supply 6. For example, the output of the power supply 6 may be 1,500 volts A.C. when the power supply 34 is set by the variac 36 to charge the charging capacitors 32 to a voltage of 1,450 volts A.C. through an adjustable current limiting resistor 40. The regulated power supply 6 also aids the initial portion of the charging through the resistor 7, which drops the voltage at peaks of current to the voltage from the diode 33 so that the capacitors 21, 22, 23 and 24 are not charged only by the higher regulated voltage peaks from the tubes 11 but also from the capacitors 32.

Radio frequency filter capacitors 55 and 56 are provided for the power supplies 34 and 6. A very high leakage resistor 57 is provided in parallel with the capacitors 32, and solenoid-controlled switches 58 and 59 are closed in the order named whenever the welding machine is shut down to discharge the capacitors 32 first through a resistor 60 and then through the switch 59. Safety switches 61, 62, 63 and 64 are provided to discharge capacitors 21, 22, 23 and 24, respectively.

Then, as the charges on the capacitors 21 and 22 approach the desired voltage, the voltage drop across resistor 7 is lessened and the regulated power supply 6 assumes an increasing portion of the total charging load until a point is reached beyond which the voltage at the cathode of diode 33 will exceed the voltage on capacitors 32 less the normal arc drop of diode 33. Beyond this point the regulated power supply completes the charging operation alone and without being hampered by the necessity of replenishing the charge on capacitors 32 as it would if diode tube 33 were not used. Then, as the charge on the capacitors 21 and 22 approaches the desired voltage, the voltage drop across the resistor 7 is lessened to bring the capacitors to the precise desired voltage. During the final charging stage, the voltage on the capacitors 32 is less than the voltage on the capacitors 21 and 22 so that no charging is effected by the capacitors 32, and the precisely regulated power supply 6 finishes the charge. The auxiliary charging capacitors 32 substantially lessen the charging time over what would be required by the regulated voltage source alone. The capacitors 32 should be equal to or, preferably, larger than the total capacitance of the capacitors 21, 22, 23 and 24 to effectively aid the regulated power supply 6.

The electrode 28 is moved toward the electrode 27 by a suitable cam-controlled trigger device (not shown) to effect welding of parts connected to these electrodes. Then, the electrode 30 is moved toward the electrode 29 by a second suitable cam-controlled trigger device (not shown) synchronized with the first trigger device, and the parts connected to these latter electrodes discharge the capacitors 23 and 24 through the coil 17 and the resistors 18 and 19 to weld these parts together. Then the parts welded together by the circuits 15 and 16 are moved away from the electrodes 27, 28, 29 and 30, and new parts to be welded are moved into engagement with the electrodes. If any of the newly arrived parts are not properly positioned, a safety mechanism (not shown) is actuated to close one of switches 45 and 46 to fire one of the thyratrons 47 and 48 to discharge the capacitors 21 and 22 or 23 and 24 immediately before the electrode 28 or the electrode 30 is moved toward the electrode 27 or the electrode 29 so as to prevent burning of the electrodes at which the improperly positioned parts are located. A welding machine suitable for use with the welding circuits shown herein and disclosing the structure of the electrodes 27, 28, 29 and 30 is disclosed and claimed in copending application Serial No. 347,335, filed April 7, 1953, now Patent No. 2,749,419, by E. W. Larsen for "Machine for Welding Contacts onto Switch Parts."

The welding machine supplied by the circuits 15 and 16 may be operated to charge the circuits 15 and 16 alternately, simultaneously or overlappingly. If it is to be effected overlappingly to limit surge currents through the tubes 33 which are high in simultaneously charging of the two circuits, the switch 31 is closed and the capacitors 32 charge in a surge the capacitors 21 and 22 a major portion of their desired charge and then the capacitors 32 and the power supply 6 continue to charge the capacitors 21 and 22. Shortly after the initial surge from the capacitors 32, a cam-controlled switch 51 is closed to trigger the tube 14 and the capacitors 32 create a surge of current to the capacitors 23 and 24. Then the capacitors 32 and the power supply 6 continue to charge the capacitors 21, 22, 23 and 24 until the voltage on these latter capacitors reaches the voltage on the capacitors 32 less the voltage drops across the tube 33 and the resistor 8 or the resistor 9. The power supply 6 completes alone the charging of the capacitors 21, 22, 23 and 24 to the precise desired voltage. Then the switches 31 and 51 are opened, and the circuits 15 and 16 are ready for welding operations.

In the use of the apparatus described hereinabove, the unregulated power supply 34 provides high initial surges of charging current so that the time required to charge the welding circuits 15 and 16 is much less than otherwise would be required, and the regulated power supply 6 is not subjected to heavy surge loads.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A capacitor-charging circuit, which comprises a capacitor, power supply means for supplying an initial surge of charging current to the capacitor to partially charge the capacitor, and a second power supply means connected in parallel with the first power supply means and having a predetermined voltage output for completing the charging of the capacitor.

2. A capacitor-charging circuit, which comprises a capacitor, a regulated power supply having a predetermined voltage output for charging the capacitor, an unregulated power supply having a maximum voltage output less than that of the regulated power supply, blocking means interconnected between the power supplies for preventing current flow from said regulated power supply to said unregulated power supply, means connected to a junction point between said blocking means and said regulated power supply for simultaneously applying the outputs of both said power supplies to said capacitor, and means connected between the regulated power supply and the junction point for limiting the load on the regulated power supply.

3. A capacitor-charging circuit, which comprises a capacitor, a charging circuit connected to said capacitor, a regulated first power supply having a predetermined voltage output connected to said charging circuit for charging the capacitor, a charged power supply having a maximum voltage output less than that of the first power supply, unidirectional current flow means interconnecting the charged power supply and said charging circuit for applying a charge to said capacitor while precluding any current flow from the first power supply to said charged power supply, and impedance means connected between the regulated power supply and the capacitor for dropping the effective voltage of the first power supply inversely with respect to the charge on the capacitor.

4. A capacitor-charging circuit, which comprises a capacitor, a power supply having a predetermined voltage output for charging the capacitor, electrical energy storing means having a maximum voltage output less than that of the power supply, means for connecting the storing means through a junction point to the capacitor, means connecting the power supply through said junction point to the capacitor, and blocking means between the junction point and the storing means for preventing current flow between said power supply and said energy storage means.

5. A capacitor-charging circuit, which comprises a capacitor, a regulated power supply having a predetermined voltage output for charging the capacitor, an unregulated power supply having a maximum voltage output less than that of the regulated power supply, a common circuit means for connecting the power supplies concurrently to the capacitor, rectifying means between the common circuit means and the regulated power supply for preventing current flow between the regulated and unregulated power supplies, and a resistor connected between the regulated power supply and the common circuit means for dropping the effective voltage of the regulated power supply inversely with respect to the charge on the capacitor.

6. A capacitor-charging circuit, which comprises a capacitance chargeable load circuit, a charging capacitor, unregulated power supply means for charging the capacitor to a voltage less than a predetermined value, a regulated power supply having a voltage output of said predetermined value, a voltage-dropping resistor connecting the regulated power supply to a predetermined point in the load circuit, and unidirectional current conducting means connecting the charging capacitor to the load circuit at the point to which the resistor is connected.

7. A capacitor-charging circuit, which comprises an unregulated power supply, a charging capacitor, rectifying means connecting the power supply to one plate of the capacitor for charging the capacitor to a predetermined voltage, a capacitor, a rectifying tube having a cathode and also being provided with an anode connected to said plate of the charging capacitor, electric valve means connecting the cathode of the rectifying tube to the capacitor, a regulated power supply, rectifying means connected to the regulated power supply, a resistor connecting the last-mentioned rectifying means to a point between the tube and the electric valve means, and periodic means for actuating the valve means whereby the capacitor is initially charged by the charged capacitor and finally charged by the regulated power supply.

8. A capacitor-charging system, which comprises an unregulated power supply, a charging capacitor, rectifying means connecting the power supply to one plate of the capacitor for charging the capacitor to a predetermined voltage, a capacitor, a diode having an anode connected to the other plate of the charging capacitor, electric valve means connecting the cathode of the diode to the capacitor, a regulated power supply, rectifying means connected to the regulated power supply, a resistor connecting the last-mentioned rectifying means to a point between the diode and the electric valve means, and means for actuating the valve means.

9. A capacitor-charging system, which comprises a charging capacitor, unregulated power means for creating a charge on the capacitor near a predetermined voltage level, a constant voltage source having a voltage level higher than said predetermined voltage level, capacitance means, rectifying means connecting the charging capacitor to the capacitance means for charging the capacitance means, and resistance means connecting the constant voltage source to the capacitance means for limiting the rate of charging of the capacitance means by the constant voltage source while the charge on the capacitance means is less than the charge on the charging capacitor.

10. A capacitor-charging system, which comprises a charging capacitor, unregulated power means for charging the capacitor to a predetermined voltage level, a constant voltage source having a voltage level higher than said predetermined voltage level, capacitance means, electric valve means connected to the capacitance means, rectifying means connecting the charging capacitor to the valve means, and resistance means connecting the constant voltage source to the valve means for limiting the rate of charging of the capacitance means by the constant voltage source.

11. A capacitor-charging system, which comprises an inductance-resistance-capacitance, an alternating current power source, an unregulated transformer supplied by the power source, capacitor means charged by said transformer, rectifying means connecting the capacitor means to the network, a constant voltage transformer supplied by the power source, the voltage output of the constant voltage transformer being higher than the maximum voltage output of the unregulated transformer, and current-limiting means connecting the constant voltage transformer to the network.

12. A capacitance-charging system, which comprises an inductance-resistance-capacitance network, an alternating current power source, an unregulated transformer supplied by the power source, rectifying means connected to the output of the transformer, capacitor means charged by said transformer and rectifying means, a diode connecting the capacitor means to the network, a constant voltage transformer supplied by the power source, the voltage output of the constant voltage transformer being higher than the maximum voltage output of the unregulated transformer, second rectifying means connected to the output of the regulated transformer, and current-limiting means in series with the second rectifying means and the network.

13. In a capacitor-charging circuit, a source of regulated potential having a predetermined value, a source of unregulated potential having a value less than said predetermined value, a capacitor, a charging circuit for said capacitor, a unidirectional current conducting means interconnecting said source of unregulated potential with said charging circuit for applying an initial charging potential to said capacitor, and a resistance circuit connecting said source of regulated potential with said charging circuit for applying a further charge to said capacitor at the same time that the capacitor is being charged through the unidirectional current conducting means by the unregulated source.

14. In an electrical-charging system, a condenser, a charging circuit for said condenser, a first means for applying a charging potential to said charging circuit to charge said condenser, a second means for simultaneously applying a charging potential to said charging circuit to charge said condenser, and means responsive to the build up in charge on said condenser for rendering said first charging means ineffective.

References Cited in the file of this patent
UNITED STATES PATENTS

| | | |
|---|---|---|
| 2,278,430 | Dawson | Apr. 7, 1942 |
| 2,294,388 | Dawson | Sept. 1, 1942 |
| 2,771,575 | Hampton | Nov. 20, 1956 |